United States Patent
Yeh (10) Patent No.: US 8,046,526 B2
(45) Date of Patent: Oct. 25, 2011

(54) WEAR LEVELING METHOD AND CONTROLLER USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 790 days.

(21) Appl. No.: 12/021,885

(22) Filed: Jan. 29, 2008

(65) Prior Publication Data

US 2009/0089485 A1    Apr. 2, 2009

(30) Foreign Application Priority Data

Sep. 27, 2007  (TW) .............................. 96135924 A (51) Int. Cl.
  *G06F 12/00*    (2006.01)
(52) U.S. Cl. . 711/103; 711/156; 711/159; 711/E12.001; 365/185.29; 365/185.33; 365/230.03

(58) Field of Classification Search ................... 711/103, 711/156, 159, E12.001; 365/185.29, 185.33, 365/230.03
See application file for complete search history.

(56) References Cited

U.S. PATENT DOCUMENTS

2008/0313505 A1 * 12/2008 Lee et al. ........................ 714/47
* cited by examiner

*Primary Examiner* — Jasmine Song
(74) *Attorney, Agent, or Firm* — J.C. Patents (57) ABSTRACT

A wear leveling method for a non-volatile memory is provided. The non-volatile memory is substantially divided into a plurality of blocks, and these blocks are grouped into at least a data area, a spare area, a substitute area, and a temporary area. The wear leveling method includes selecting blocks from the spare area according to different purposes and executing a wear leveling procedure.

45 Claims, 10 Drawing Sheets

WEAR LEVELING METHOD AND CONTROLLER USING THE SAME

CROSS-REFERENCE TO RELATED APPLICATION

This application claims the priority benefit of Taiwan application serial no. 96135924, filed on Sep. 27, 2007. The entirety of the above-mentioned patent application is hereby incorporated by reference herein and made a part of this specification.

BACKGROUND OF THE INVENTION

1. Field of the Invention

The present invention generally relates to a wear leveling method, in particular, to a wear leveling method for a non-volatile memory and a controller using the same.

2. Description of Related Art

Along with the widespread of digital cameras, camera phones, and MP3 in recently years, the consumers' demand to storage media has increased drastically too. Flash memory is one of the most adaptable memories for such battery-powered portable products due to its characteristics such as data non-volatility, low power consumption, small volume, and non-mechanical structure. Besides being applied in foregoing portable products, flash memory is also broadly applied to external products such as flash cards and flash drives, and an even larger market is provided since one can have more than one flash card and flash drive. Thereby, flash memory has become one of the most focused electronic products in recent years.

Flash memory can offer such advantages as data rewritability and power-free data storage. However, blocks in a flash memory can be erased only a limited number of times, for example, a block in a flash memory is worn-out after being erased 10,000 times. Data loss may be caused when the storage capacity or performance of a flash memory is obviously deteriorated by its worn-out blocks.

The wear of a block in a flash memory is determined by the number of times this block is programmed or erased. In other words, the wear of a block is relatively low if the block is programmed (or written) only once; contrarily, the wear of a block is relatively higher if the block is programmed and erased repeatedly. For example, when a host keeps writing data into a flash memory by using the same logical block address (LBA), the block having the corresponding physical block address (PBA) in the flash memory is then repeatedly written and erased.

Generally speaking, the existence of worn-out blocks will reduce the performance of a flash memory even if the wear of other blocks are still relatively low. Besides the deterioration in the performance of the worn-out blocks, the performance of the entire flash memory is also reduced when the good blocks cannot provide enough space for storing data. In other words, when the number of worn-out blocks in a flash memory exceeds a threshold value, the flash memory is considered unusable even there are still good blocks. In this case, those good blocks are wasted.

Blocks in a flash memory should be used evenly in order to prolong the life of the flash memory. Blocks in a flash memory are usually grouped into a data area and a spare area. According to a conventional wear leveling method, blocks in the data area and blocks in the spare area are logically exchanged in an appropriate sequence at regular intervals, so that those blocks which are erased fewer times can be exchanged to the spare area to be programmed or written. However, such sequential exchange cannot guarantee that those blocks erased fewer times will be exchanged, and the exchanged blocks will be worn even more quickly if these blocks have been erased many times. As described above, the conventional wear leveling method is not very satisfactory.

Accordingly, a wear leveling method which can effectively prolong the life of a flash memory is to be provided.

SUMMARY OF THE INVENTION

Accordingly, the present invention is directed to a wear leveling method for a non-volatile memory, wherein the wearing of blocks in the non-volatile memory is effectively leveled and accordingly the life of the non-volatile memory is prolonged.

The present invention is directed to a controller which executes a wear leveling method for a non-volatile memory, wherein the wearing of blocks in the non-volatile memory is effectively leveled and accordingly the life of the non-volatile memory is prolonged.

The present invention provides a wear leveling method for a non-volatile memory. The non-volatile memory is substantially divided into a plurality of blocks, and these blocks are grouped into at least a data area, a spare area, a substitute area, and a temporary area. The wear leveling method includes: (a) selecting blocks from the spare area according to different purposes; and (b) executing a wear leveling procedure.

The present invention provides a controller suitable for a storage device, wherein a non-volatile memory of the storage device is substantially divided into a plurality of blocks and there blocks are grouped into at least a data area, a spare area, a substitute area, and a temporary area. The controller includes a microprocessor unit, a buffer memory, a non-volatile memory interface, and a memory management module. The microprocessor unit is configured for controlling a whole operation of the controller. The buffer memory is electrically connected to the microprocessor unit and configured for temporarily storing data. The non-volatile memory interface is electrically connected to the microprocessor unit and configured for accessing the non-volatile memory. The memory management module is electrically connected to the microprocessor unit and configured for managing the non-volatile memory, wherein the memory management module selects blocks from the spare area according to different purposes, and exchanges a block in the spare area with a block in the data area.

The present invention provides a wear leveling method for a non-volatile memory, wherein the non-volatile memory is substantially divided into a plurality of blocks and these blocks are grouped into at least a data area, a spare area, and a substitute area. The wear leveling method includes: (a) determining a hot area in the spare area in order to identify at least one block having relatively higher erase count in the spare area; (b) selecting a first block to be used in the substitute area from the spare area by using the sum of the erase count of the block in the hot area and a first threshold as a selection condition; and (c) executing a wear leveling procedure.

The present invention provides a controller suitable for a storage device, wherein a non-volatile memory in the storage device is substantially divided into a plurality of blocks and these blocks are grouped into at least a data area, a spare area, and a substitute area. The controller includes a microprocessor unit, a buffer memory, a non-volatile memory interface, and a memory management module. The microprocessor unit is configured for controlling a whole operation of the controller. The buffer memory is electrically connected to the microprocessor unit and configured for temporarily storing data. The non-volatile memory interface is electrically connected to the microprocessor unit and configured for accessing the non-volatile memory. The memory management module is electrically connected to the microprocessor unit and configured for managing the non-volatile memory, wherein the memory management module executes a wear leveling method. The memory management module manages the non-volatile memory, wherein the memory management module determines a hot area in the spare area in order to identify at least one block having relatively higher erase count in the spare area, selects a first block to be used in the substitute area from the spare area by using the sum of the erase count of the block in the hot area and a first threshold as a selection condition and exchanges a block in the spare area with a block in the data area.

The present invention provides a wear leveling method for a non-volatile memory, wherein the non-volatile memory is substantially divided into a plurality of blocks and these blocks are grouped into at least a data area, a spare area, a substitute area, and a temporary area. The wear leveling method includes: (a) determining a hot area in the spare area in order to identify at least one block having relatively higher erase count in the spare area; (b) selecting a first block to be used in the substitute area from the spare area; (c) using the comparison between the erase count of the hot area and a predetermined value as a counting condition; and (d) executing a wear leveling procedure when a counting value is greater than a third threshold.

The present invention provides a wear leveling method, wherein blocks in a non-volatile memory are used evenly so that the wear of these blocks is leveled and accordingly the life of the non-volatile memory is prolonged.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

A non-volatile memory storage system usually includes a non-volatile memory and a controller (control IC). A non-volatile memory storage system is usually used together with a host system so that the host system can write data into the non-volatile memory storage system or read data from the same. In addition, a non-volatile memory storage system may also include an embedded non-volatile memory and software which can be executed by a host system to substantially serve as a controller of the embedded non-volatile memory.

First Embodiment

Figure 1A:
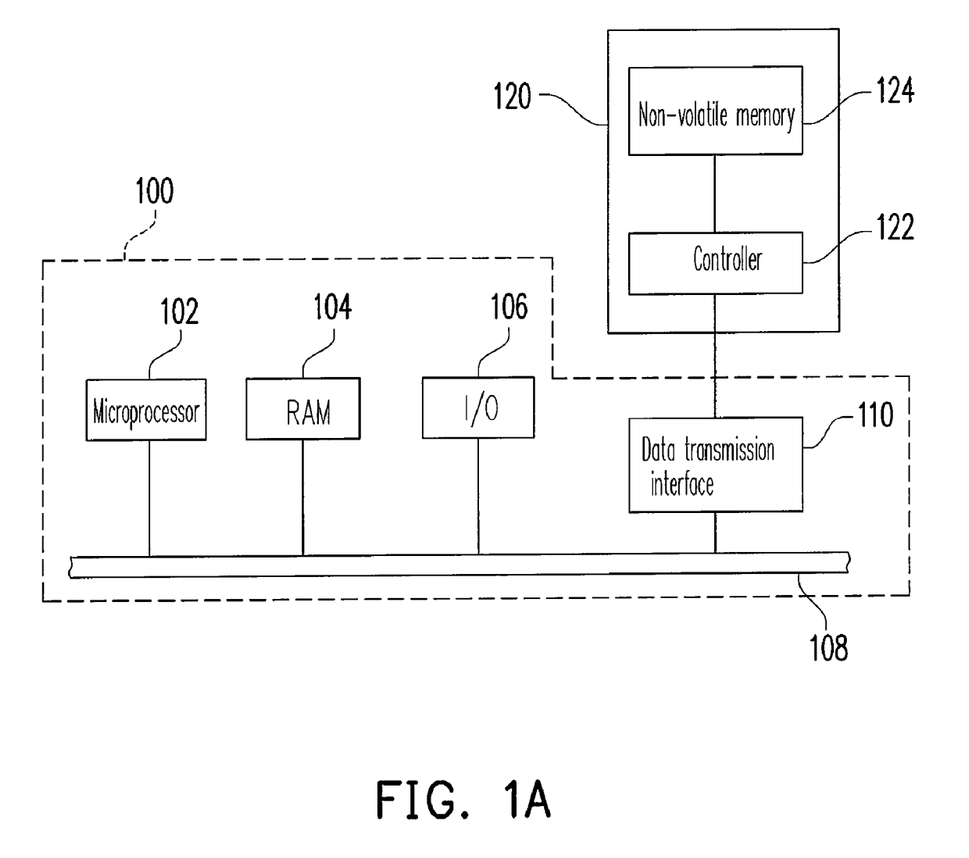
FIG. 1A illustrates a host having a non-volatile memory storage device according to a first embodiment of the present invention.

FIG. 1A illustrates a host having a non-volatile memory storage device according to the first embodiment of the present invention.

Referring to FIG. 1A, the host 100 includes a microprocessor 102, a random access memory (RAM) 104, an input/output (I/O) device 106, a system bus 108, and a data transmission interface 110. It should be noted that the host 100 may further include other components, such as a display or a network device.

The host 100 may be a computer, a digital camera, a video camera, a communication device, an audio player, or a video player. Generally speaking, the host 100 can be any system which can store data.

In the present embodiment, the non-volatile memory storage device 120 is electrically connected to other components of the host 100 through the data transmission interface 110. Data can be written into or read from the non-volatile memory storage device 120 through the microprocessor 102, the RAM 104, and the I/O device 106. The non-volatile memory storage device 120 may be a flash drive, a memory card, or a solid state drive (SSD).

Figure 1B:
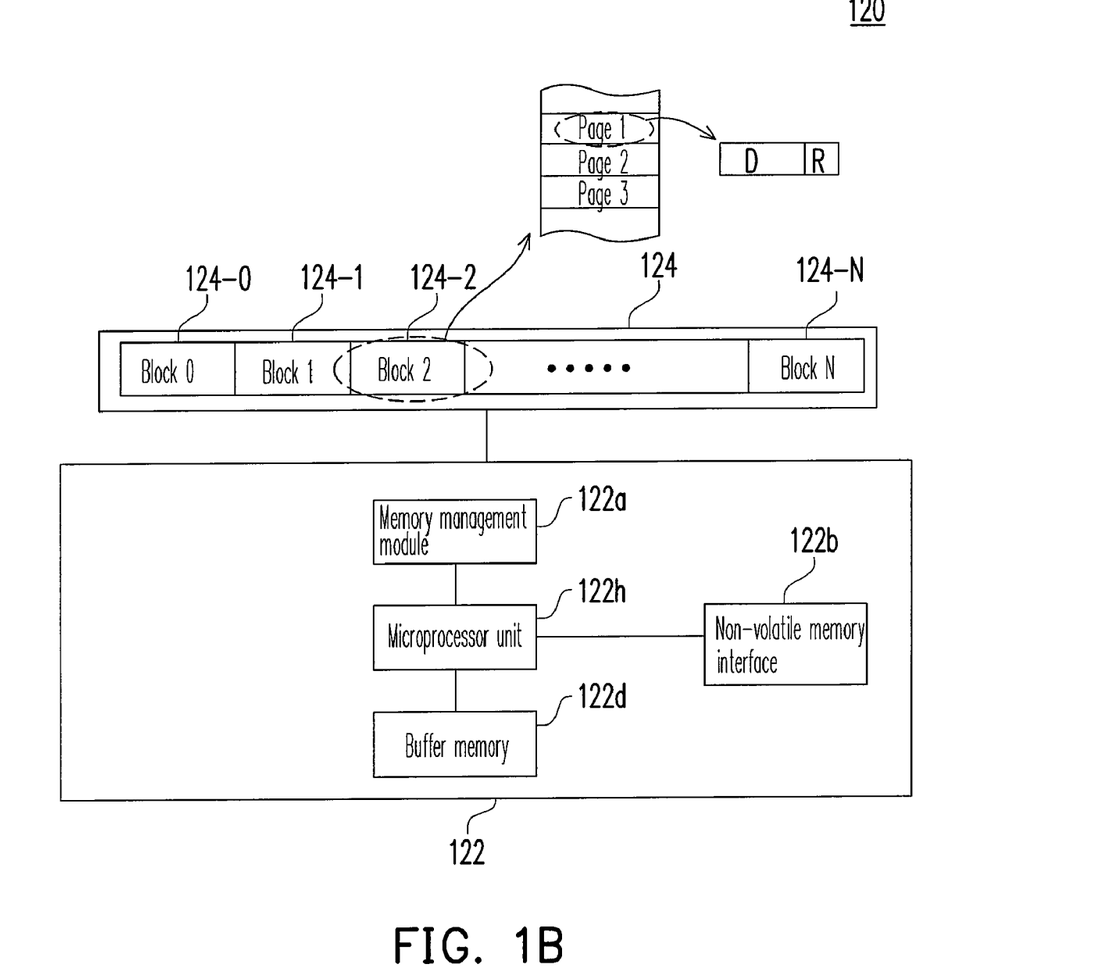
FIG. 1B is a detailed block diagram of the non-volatile memory storage device in FIG. 1A.

FIG. 1B is a detailed block diagram of the non-volatile memory storage device in FIG. 1A.

Referring to FIG. 1B, the non-volatile memory storage device 120 includes a controller 122 and a non-volatile memory 124.

The controller 122 controls the operation of the non-volatile memory 124, such as data storage, data reading, and data erasing etc. The controller 122 includes a memory management module 122a, a non-volatile memory interface 122b, a buffer memory 122d, and a microprocessor unit 122h.

The memory management module 122a is electrically connected to the microprocessor unit 122h and used for managing the non-volatile memory 124, for example, for executing a wear leveling method, managing bad blocks, and maintaining a mapping table etc.

The non-volatile memory interface 122b is electrically connected to the microprocessor unit 122h and used for accessing the non-volatile memory 124, namely, data to be written into the non-volatile memory 124 by the host 100 is converted by the non-volatile memory interface 122b into a format which is acceptable to the non-volatile memory 124.

The buffer memory 122d is electrically connected to the microprocessor unit 122h and temporarily stores system data (for example, a mapping table) or data to be read or written by the host. In the present embodiment, the buffer memory 122d is a static random access memory (SRAM). However, the present invention is not limited thereto, and the buffer memory 122d may also be a dynamic random access memory (DRAM), a magnetoresistive random access memory (MRAM), a phase change random access memory (PCRAM), or other suitable memories.

The microprocessor unit 122h controls the operation of the relative components in the controller 122.

In another embodiment of the present invention, the controller (as the controller 122' illustrated in FIG. 1C) further includes a host transmission interface 122c, a program memory 122e, an error correcting module 122f, and a power management module 122g.

Figure 1C:
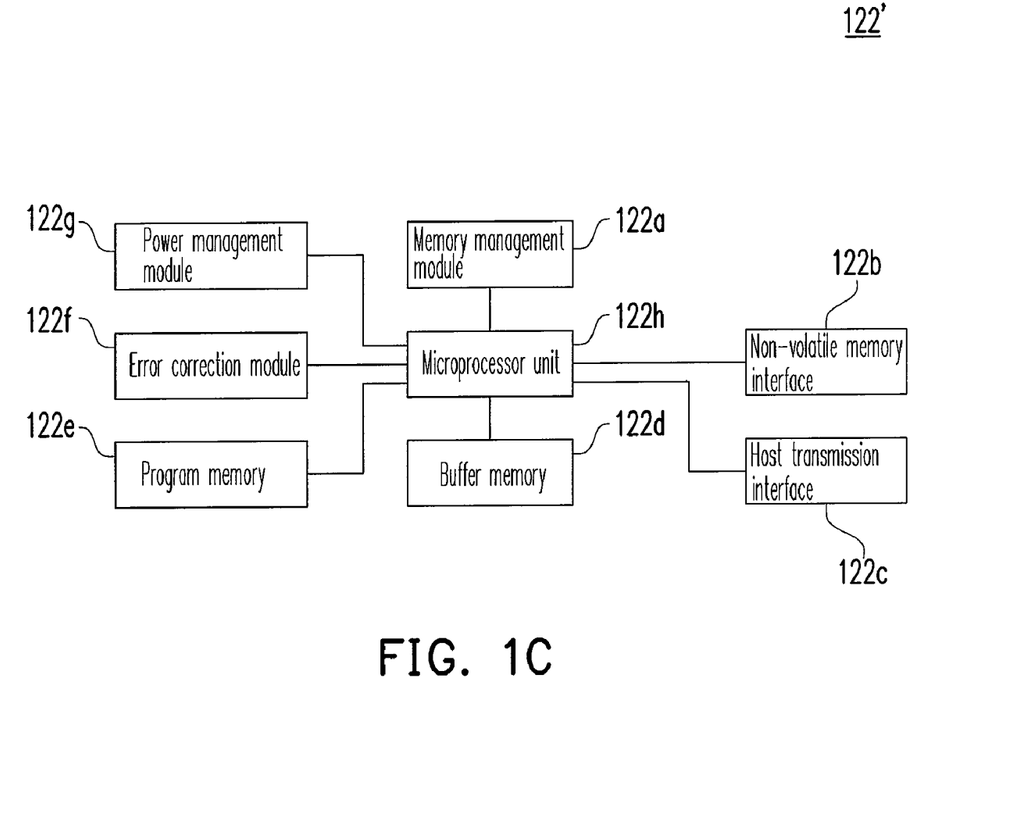
FIG. 1C is a block diagram of a controller according to another embodiment of the present invention.

The host transmission interface 122c is electrically connected to the microprocessor unit 122h and used for communicating with the host 100. The host transmission interface 122c may be a USB interface, an IEEE 1394 interface, a SATA interface, a PCI Express interface, a MS interface, a MMC interface, a SD interface, a CF interface, or an IDE interface.

The program memory 122e electrically connected to the microprocessor unit 122h and stores a program executed by the controller for controlling the non-volatile memory storage device 120.

The error correcting module 122f electrically connected to the microprocessor unit 122h and calculates an error correcting code (ECC code) for checking and correcting the data to be read or written by the host.

The power management module 122g electrically connected to the microprocessor unit 122h and manages the power supply of the non-volatile memory storage device 120.

The non-volatile memory 124 stores data. In the present embodiment, the non-volatile memory 124 is a flash memory. To be specific, the non-volatile memory 124 is a multi-level cell (MLC) NAND flash memory. However, the present invention is not limited thereto, and the non-volatile memory 124 may also be a single-level cell (SLC) NAND flash memory.

The non-volatile memory 124 is substantially divided into a plurality of physical blocks 124-0~124-N, and for the convenience of description, these physical blocks will be referred to as blocks thereinafter. Generally speaking, data in a flash memory is erased in unit of blocks. In other words, each block contains the smallest number of memory cells which are erased together. Each block is usually divided into a plurality of pages. A page is the smallest programming unit. However, it has to be noted that the smallest programming unit may also be a sector in some other designs of flash memory, namely, a page is further divided into a plurality of sectors and each sector is the smallest programming unit. In other words, a page is the smallest unit for writing and reading data. A page usually includes a user data area D and a redundant area R, wherein the user data area is used for storing user data, and the redundant area is used for storing system data (for example, foregoing ECC code).

The user data area D usually has 512 bytes and the redundant area R usually has 16 bytes in order to correspond to the size of a sector in a disk driver. Namely, a page is a sector. However, a page may also be composed of more than one sector. For example, a page may include four sectors. Generally speaking, a block may contain any number of pages, for example, 64 pages, 128 pages, and 256 pages etc. The blocks 124-0~124-N may also be grouped into a plurality of zones. By managing operations of a memory based on zones, parallelism of the operations can be increased and the management can be simplified.

If some blocks in the non-volatile memory 124 are continuously programmed (for example, repeatedly written or erased), these blocks are usually worn out more quickly than those blocks which are not continuously programmed. According to the wear leveling method provided by the present invention, those continuously programmed blocks are automatically used less while the other blocks are used more, so that the wear of blocks in the non-volatile memory 124 can be effectively leveled and accordingly the life of the non-volatile memory 124 can be prolonged.

The operation of a non-volatile memory according to the present invention will be described with reference to accompanying drawings. It has to be understood that in following descriptions, terms like "select", "move", and "exchange" are only used for referring to the logical operations performed to blocks in the flash memory. In other words, the physical positions of blocks in the flash memory are not changed and these operations are only performed to these blocks logically.

Figure 2A:
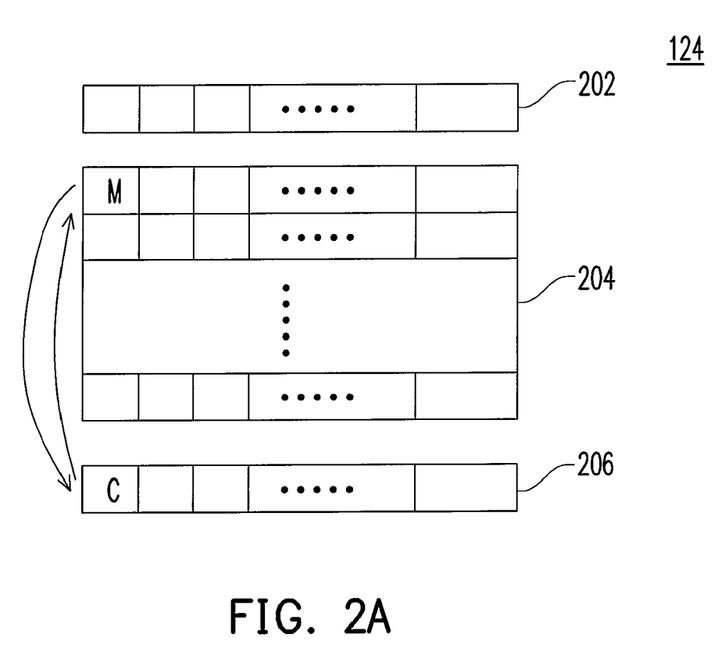
FIGS. 2A and 2B are detailed block diagrams of a non-volatile memory and the operation thereof according to the first embodiment of the present invention.
Figure 2B:
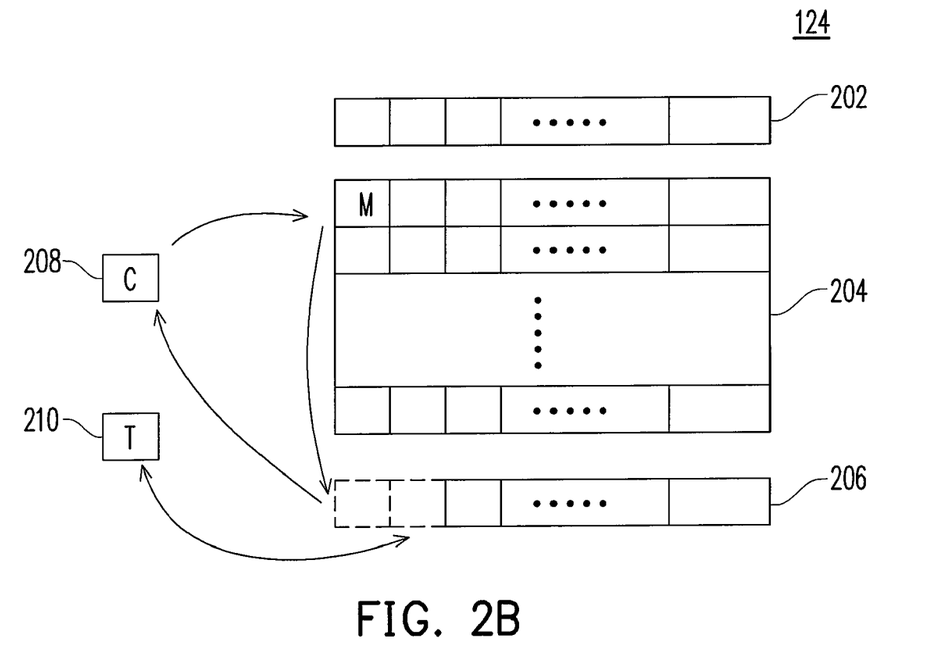

FIGS. 2A and 2B are detailed block diagrams of the non-volatile memory 124 and the operation thereof according to the first embodiment of the present invention.

Referring to FIGS. 1B and 2A, in the present embodiment, the blocks 124-1~124-N of the non-volatile memory 124 are logically grouped into a system area 202, a data area 204, and a spare area 206 so as to program (i.e., write and erase) the non-volatile memory 124 effectively. Generally speaking, more than 90% of the blocks in the non-volatile memory 124 belong to the data area 204.

Blocks in the system area 202 are used for recording system data, such as the number of zones in the non-volatile memory 124, the number of blocks in each zone, the number of pages in each block, and a logical-physical mapping table etc.

Blocks in the data area 204 are used for storing user data. Generally speaking, these blocks are corresponding to the logical block addresses (LBAs) on which the host 100 operates.

Blocks in the spare area 206 are used for replacing blocks in the data area 204. Accordingly, the blocks in the spare area 206 are empty or available blocks, namely, no data is recorded in these blocks or data recorded in these blocks has been marked as invalid data. To be specific, an erase operation has to be performed before writing data into a position in which data has been recorded. However, as described above, data is written into a flash memory in unit of pages while erased from the same in unit of blocks. Since an erase unit is larger than a write unit, before erasing data from a block, those valid pages in the block have to be copied to another block. Accordingly, to write a new data into a block M in the data area 204 in which a data has been recorded, a block C is first selected from the spare area 206, and the valid data in block M is copied to block C and the new data is also written into block C. After that, block M is erased and moved to the spare area 206, and at the same time, block C is moved to the data area 204. It has to be understood that moving block M to the spare area 206 and at the same time moving block C to the data area 204 means that the block M is logically connected to the spare area 206 and the block C is logically connected to the data area 204. It should be understood by those having ordinary knowledge in the art that the logical relationship between blocks in the data area 204 can be maintained through a logical-physical mapping table.

In the present embodiment, the blocks 124-1~124-N are further grouped into a substitute area 208 and a temporary area 210 logically so as to increase the efficiency of the non-volatile memory 124.

Referring to FIG. 2B, the substitute area 208 temporarily stores blocks used for substituting blocks in the data area 204. To be specific, in the present embodiment, when the block C in the spare area 206 is selected for replacing the block M in the data area 204, the new data is written into block C but the valid data in block M is not instantly copied into block C to erase block M. This is because the valid data in block M may become invalid in the next operation, so that moving the valid data in block M instantly to block C may become meaningless. In the present embodiment, the block C containing the new data is temporarily connected to the substitute area 208, and the fact that multiple physical block addresses (PBAs) are mapped to one LBA is recorded. Namely, the combination of contents in block M and in block C is the content of the corresponding logical block. Accordingly, the blocks in the non-volatile memory can be used more efficiently. Such mother-child relationship between blocks (such as block M and block C) can be determined according to the size of the buffer memory 122d in the controller 122, and in the present embodiment, five sets of blocks having such relationship are assumed.

The temporary area 210 has similar function as the substitute area 208. As described above, in the present embodiment, the non-volatile memory is a MLC NAND flash memory. In the MLC NAND flash memory, each page contains four sectors, namely, each page has four sectors of 512 bytes, which is 2048 bytes in total. As described above, data is written into a flash memory in unit of pages. Accordingly, four sectors have to be programmed each time while writing data into the MLC NAND flash memory, so that the memory space may be wasted when the data to be written is less than one page. In the present embodiment, the temporary area 210 is used for storing such data of small quantity. To be specific, if the data to be written into the block C in the substitute area 208 is less than one page, a block T is selected from the spare area 206 and this data is written into the block T. The block T is then connected to the temporary area 210. When subsequently the data to be written into the memory is enough for one page, the data is then written into the block C, and the block T is erased and moved from the temporary area 210 to the spare area 206.

It should be mentioned that the logical mapping relationships between foregoing blocks are continuously updated during the operation of the non-volatile memory storage device, and the related information may be recorded into blocks in the system area 202 after the operation of the non-volatile memory storage device is completed or after the non-volatile memory storage device performs a particular number of actions. The logical mapping relationships are recorded in a logical-physical mapping table, a spare block table, a substitute block table, and a temporary block table, and these tables will be explained below with reference to FIGS. 4A-4D.

Those blocks frequently exchanged between the data area 204 and the spare area 206 are referred to as dynamic data blocks. In the present embodiment, the substitute area 208 and the temporary area 210 are adopted in order to use these dynamic data blocks more efficiently. In addition, some data written into the data area 204 may remain unchanged for a long time. For example, a user writes 100 MP3 songs into the data area 204 and leaves them untouched thereafter. Blocks storing such data are referred to as static data blocks. The static data blocks have relatively lower erase counts since they are seldom changed. In the present embodiment, the memory management module 122a in the controller 122 executes a wear leveling method for effectively levelling the wear of the blocks 124-1~124-N.

Figure 3:
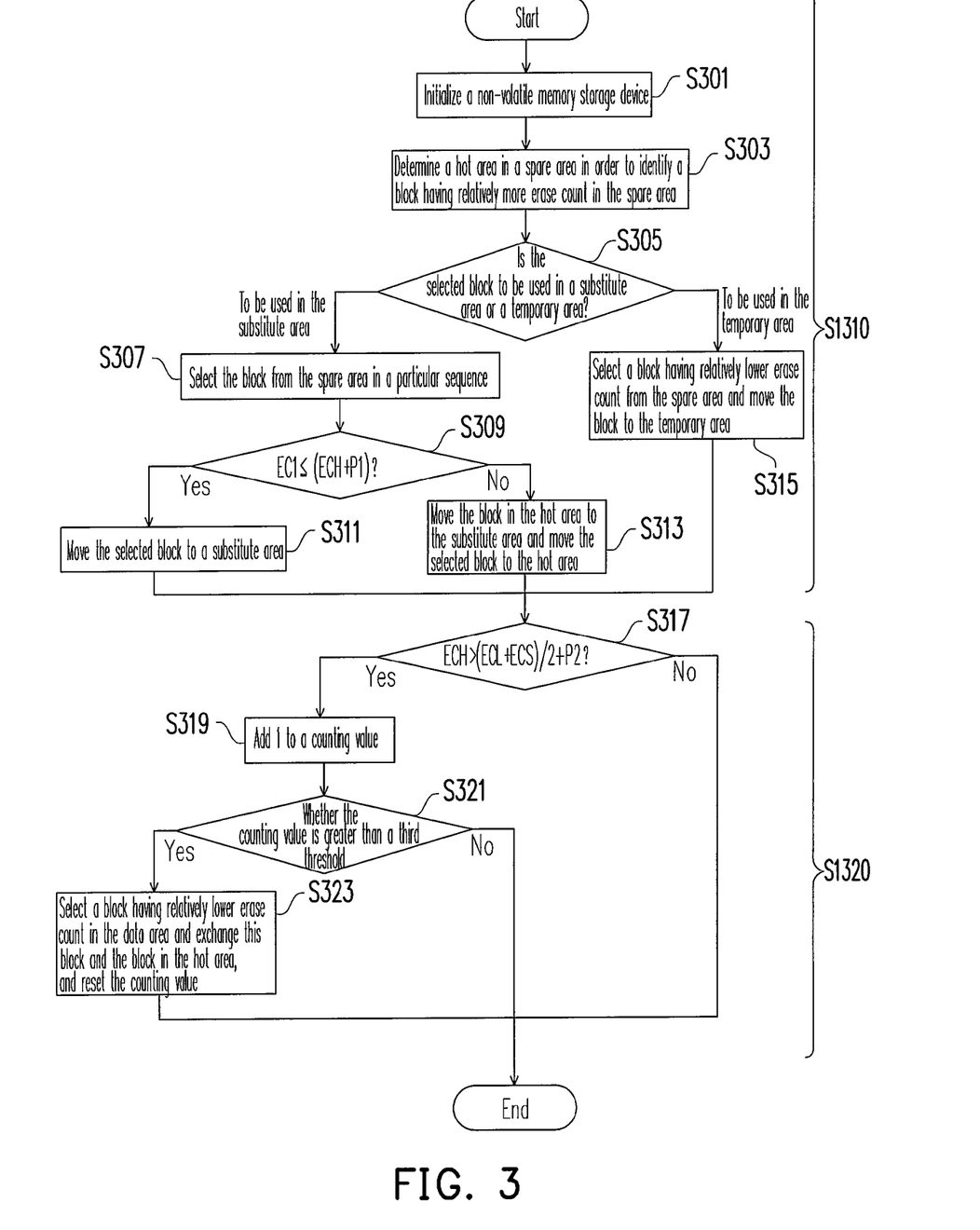
FIG. 3 is a flowchart of a wear leveling method according to the first embodiment of the present invention.

FIG. 3 is a flowchart of a wear leveling method executed by the controller 122 according to the first embodiment of the present invention, wherein blocks in the non-volatile memory are evenly programmed so that the wear of these blocks can be leveled. According to the present invention, the wear leveling method includes selecting blocks from a spare area according to different purposes and conditions (step S1310) and executing a wear leveling procedure (step S1320). The wear leveling method will be described below with reference to FIG. 3.

Referring to FIG. 3 and FIG. 1B, the erase counts of the blocks 124-1~124-N in the non-volatile memory 124 have to be recorded in order to level the wear of these blocks. In step S301, at least one data block erase count table, one spare block erase count table, one substitute block erase count table, and one temporary block erase count table are established or loaded while initializing the non-volatile memory storage device 120. To be specific, these tables are established if they are not stored in the system area 202 of the non-volatile memory 124; instead, these tables are loaded into the buffer memory 122d of the controller 122 if they are already stored in the system area 202.

Figure 4A:
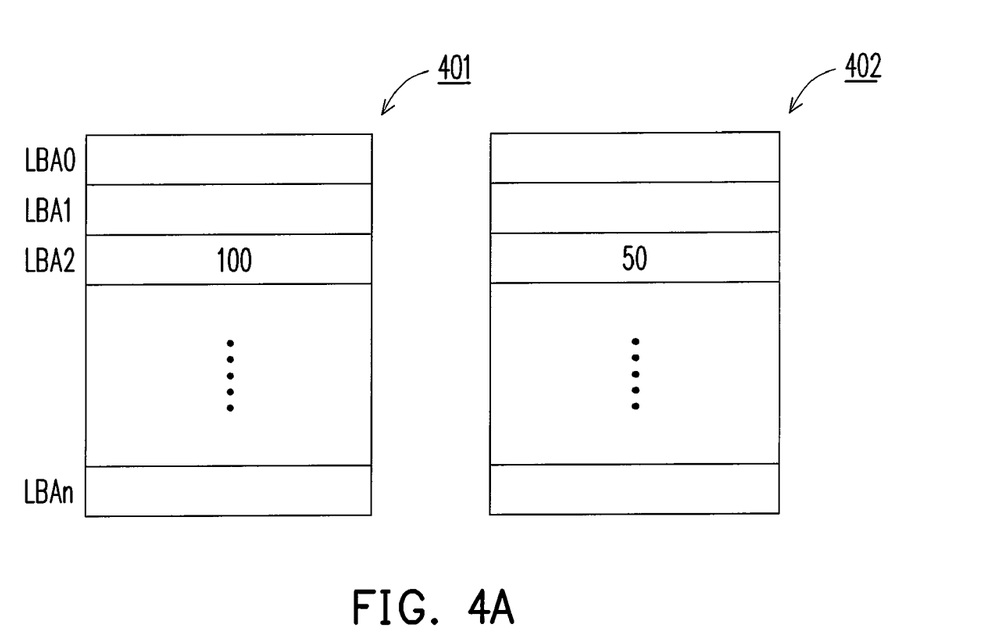
FIG. 4A illustrates a logical-physical mapping table and a data block erase count table according to the first embodiment of the present invention.
Figure 4B:
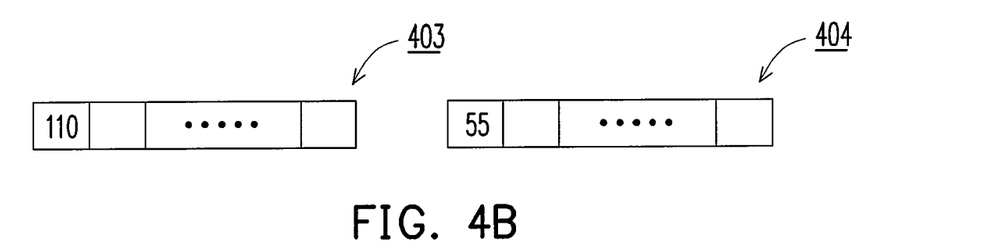
FIG. 4B illustrates a spare block table and a spare block erase count table according to the first embodiment of the present invention.
Figure 4C:
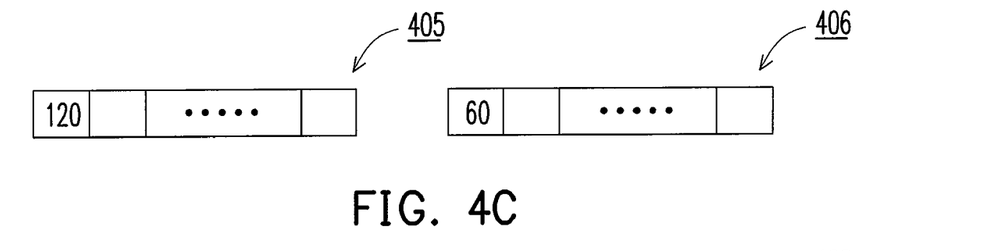
FIG. 4C illustrates a substitute block table and a substitute block erase count table according to the first embodiment of the present invention.
Figure 4D:
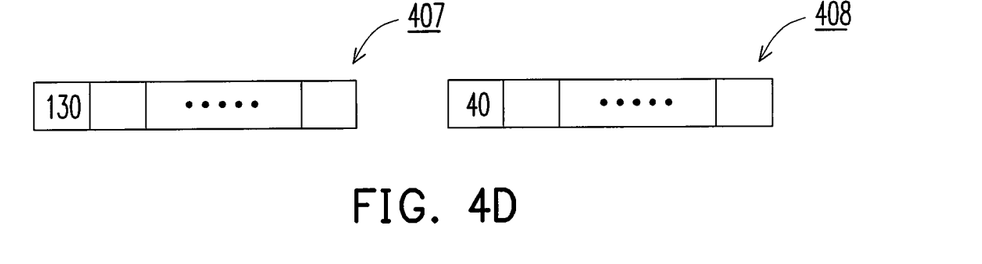
FIG. 4D illustrates a temporary block table and a temporary block erase count table according to the first embodiment of the present invention.

FIG. 4A illustrates a logical-physical mapping table and a data block erase count table according to the first embodiment of the present invention. FIG. 4B illustrates a spare block table and a spare block erase count table according to the first embodiment of the present invention. FIG. 4C illustrates a substitute block table and a substitute block erase count table according to the first embodiment of the present invention. FIG. 4D illustrates a temporary block table and a temporary block erase count table according to the first embodiment of the present invention.

Referring to FIG. 4A and FIG. 1B, a LBA is stored in the logical-physical mapping table 401, and the value at the LBA is a corresponding physical block address (PBA) in the non-volatile memory 124, namely, a block in the data area 204. Accordingly, a table having the same dimensions as the logical-physical mapping table is established and which is referred as a data block erase count table 402. This data block erase count table 402 is used for recording the erase counts of all the blocks at the PBAs stored in the logical-physical mapping table. For example, the value of the third LBA 2 in the logical-physical mapping table 401 is 100 and the value at the third line in the data block erase count table 402 is 50, which means LBA 2 is mapped to a physical block 100, and the erase count of the physical block 100 is 50. It should be mentioned that for the convenience of management, physical blocks in a non-volatile memory are generally grouped into a plurality of zones, and accordingly the logical-physical mapping table is actually established according to the number of these zones. For example, 8 logical-physical mapping tables are established if the physical blocks in a non-volatile memory are grouped into 8 zones. According to the present invention, data block erase count tables of the same number as the logical-physical mapping tables are established accordingly. For the convenience of description, it is assumed that the physical blocks in the present embodiment are grouped into only one zone.

In the present embodiment, when the host 100 continuously accesses blocks in the logical-physical mapping table 401, the controller 122 updates the data block erase count table 402 instantly, and the controller 122 scans the entire data block erase count table 402 and records a block having the lowest erase count when the host 100 erases or writes data into the blocks. If the non-volatile memory 124 is divided into N zones, the controller 122 respectively records the erase count of a block having the lowest erase count in each of the N data block erase count tables 402, and then the controller 122 compares the lowest erase counts recorded in the N data block erase count tables 402 and records the block having the lowest erase count.

Referring to FIG. 4B and FIG. 2B, the spare block table 403 is used for recording blocks connected to the spare area 206, and the spare block erase count table 404 is used for recording the erase count of each block in the spare area 206 according to the spare block table 403. For example, a block 110 is currently connected to the spare area 206 and the erase count thereof is 55 if 110 is recorded in the first position of the spare block table 403 and 55 is recorded in the first position of the spare block erase count table 404.

Referring to FIG. 4C and FIG. 2B, the substitute block table 405 is used for recording blocks connected to the substitute area 208, and the substitute block erase count table 406 is used for recording the erase count of each block in the substitute area 208 according to the substitute block table 405. For example, a block 120 is currently connected to the substitute area 208 and the erase count thereof is 60 if 120 is recorded in the first position of the substitute block table 405 and 60 is recorded in the first position of the substitute block erase count table 406.

Referring to FIG. 4D and FIG. 2B, similarly, the temporary block table 407 is used for recording blocks connected to the temporary area 210, and the temporary block erase count table 408 is used for recording the erase count of each block in the temporary area 210 according to the temporary block table 407. For example, a block 130 is currently connected to the temporary area 210 and the erase count thereof is 40 if 130 is recorded in the first position of the temporary block table 407 and 40 is recorded in the first position of the temporary block erase count table 408.

Referring to FIGS. 1B and 2B, it should be mentioned that foregoing erase count tables in the buffer memory 122d are constantly updated every time when a block is erased during the operation of the non-volatile memory storage device, and the related information may be recorded into blocks in the system area 202 after the operation of the non-volatile memory storage device 120 is completed or after the non-volatile memory storage device 120 performs a particular number of actions. This backup action is performed in order to avoid loss of the updated block tables and erase count tables caused by unexpected power failure.

Referring to FIG. 3 again, in step S303, a hot area (not shown) is determined in the spare area 206 so as to identify a block having relatively higher erase count in the spare area 206. To be specific, the block having relatively higher erase count is located and recorded according to the spare block table and the spare block erase count table established or loaded in step S301. It has to be understood here that the block having "relatively higher erase count" refers to a block having the highest or relatively higher erase count among a particular number of blocks. For example, the block having higher erase count in the spare area is a block whose erase count is higher than the average erase count of the blocks in the spare area. The hot area (not shown) is determined in order to avoid selecting those blocks having higher erase counts in the spare area 206 since three blocks in the spare area 206 are always selected and used as substitute blocks. It should be mentioned that even in the present embodiment, only one block having higher erase count is identified by the hot area (not shown), in another embodiment of the present invention, multiple blocks (for example, 2 or 3) having higher erase counts can be identified by the hot area (not shown).

To select a block (i.e. a program memory block) from the spare area 206, whether the selected block is to be used in the substitute area 208 or the temporary area 210 is determined in step S305. In other words, according to the wear leveling method, when a block is selected from the spare area 206, whether the block is to be used for general purpose (in the substitute area 208) or for storing data temporarily (in the temporary area 210) is determined. To be specific, in the present embodiment, different selection conditions are applied according to whether the selected block is to be used in the substitute area 208 or the temporary area 210.

If it is determined in step S305 that the selected block is to be used in the substitute area 208, then in step S307, the block (referred to as a first block thereinafter) is selected from the spare area 206 in a particular sequence, and in step S309, whether $EC1 \leqq (ECH+P1)$ is determined, wherein EC1 represents the erase count of the first block, ECH represents the erase count of the block in the hot area (not shown), and P1 is a first threshold. The first threshold is a number determined according to an expected wear levelling effect. In the present embodiment, the first threshold may be any number between 10 and 50, preferably 20. Additionally, in another embodiment of the present invention, ECH represents the erase count of any block in the hot area (not shown) if more than one block is identified by the hot area (not shown).

If it is determined in step S309 that $EC1 \leqq (ECH+P1)$, the first block is moved to the substitute area 208 in step S311. To be specific, in step S311, a connection between the first block and the substitute area 208 is produced and at the same time, the connection between the first block and the spare area 206 is cancelled. If it is determined in step S309 that $EC1 > (ECH+P1)$, then in step S313, the block in the hot area (not shown) is moved to the substitute area 208 for replacing the first block. To be specific, in step S313, a connection between the block in the hot area (not shown) and the substitute area 208 is produced and at the same time, the connection between the block in the hot area and the spare area 206 is cancelled, and after that, the first block is identified as a block in the hot area (not shown).

In another embodiment of the present invention, the first block is exchanged with any one block in the hot area (not shown) if more than one block is identified by the hot area (not shown).

If it is determined in step S305 that the selected block is to be used in the temporary area 210, then in step S315, a block having relatively lower erase count is selected from the spare area 206 (referred to as a second block thereinafter) and moved to the temporary area 210. Namely, the connection between the second block and the spare area 206 is cancelled and at the same time, a connection between the second block and the temporary area 210 is produced. Here it has to be understood that the block having "relatively lower erase count" refers to a block having the lowest or lower erase count among a particular number of blocks. For example, the block having lower erase count in the spare area is a block whose erase count is lower than the average erase count of the blocks in the spare area.

The wear leveling method further includes starting and executing a wear leveling procedure (step S1320) besides selecting a block from the spare area according to different purpose. The wear levelling procedure is that exchanging a block in the spare area with a block in the data area. In the present embodiment, the comparison between the erase count of the hot area and a predetermined value is used as a counting condition. To be specific, whether $ECH > (ECL+ECS)/2+P2$ is determined after each time a block is selected from the spare area 206 (step S317), wherein ECL and ECS respectively represent a maximum erase count and a minimum erase count among the erase counts of all the blocks in the data area 204, the spare area 206, the substitute area 208, and the temporary area 210 (however, the maximum erase count ECL and the minimum erase count ESC may also be defined among some particular blocks or blocks in some particular data areas according to the actual design requirement), and P2 is a second threshold. The second threshold is a number determined according to a expected wear levelling effect, and in the present embodiment, the second threshold is a any positive number which makes the value of (ECL+ECS)/2+P2 greater than the average of ECL and ECS but smaller than ECL. If it is determined in step S317 that ECH>(ECL+ECS)/2+P2, then in step S319, a counting value is increased by 1 and recorded into the buffer memory 122*d*.

In another embodiment of the present invention, the counting value may also be increased by 1 and recorded into the buffer memory 122*d* (not shown) while executing an erase or a write operation.

In step S321, whether the counting value is greater than a third threshold is determined, wherein the third threshold is a number determined according to an expected wear levelling effect. In the present embodiment, the third threshold can be any positive number, for example, 10. If it is determined in step S321 that the counting value is greater than the third threshold, then in step S323, a block having relatively lower erase count is selected from the data area 204 (referred to as a third block thereinafter) and is exchanged with the block in the hot area (not shown), and the counting value is then reset (for example, to 0). Namely, a connection between the block in the hot area (not shown) and the data area 204 is produced and the connection between the block in the hot area (not shown) and the spare area 206 is cancelled. Meanwhile, a connection between the third block and the spare area 206 is produced, the third block is identified as a block in the hot area (not shown), and the connection between the third block and the data area 204 is cancelled (i.e. the wear leveling procedure).

Additionally, in another embodiment of the present invention wherein the hot area (not shown) includes more than one blocks, the third block is exchanged with any block or a block having relatively higher erase count in the hot area (not shown).

In another embodiment of the present invention, if more than one block has the lowest erase count in the data area 204, a block corresponding to the maximum LBA is selected as the third block in step S323.

In another embodiment of the present invention, if more than one block has the lowest erase count in the data area 204, a block corresponding to the smallest LBA or any LBA is selected as the third block in step S323.

It should be mentioned that in another embodiment of the present invention, the step S323 is completed by executing a normal write command issued by the host 100 in the controller 122. To be specific, in the present embodiment, the controller 122 executes a write command while executing the step S323, and the data to be written is an empty set. The block in the hot area (not shown) and the third block are exchanged by executing this normal write command which produces foregoing parent-son block relationship.

Second Embodiment

The hardware structure, the operation of the non-volatile memory, and the recording of the block erase counts in the second embodiment of the present invention are the same as those in the first embodiment (as shown in FIGS. 1A~1B, 2A~2B, and 4A~4D) therefore will not be described herein. The difference between the second embodiment and the first embodiment is that in the second embodiment, a selection condition is specified to blocks which are to be used only in the substitute area.

Figure 5:
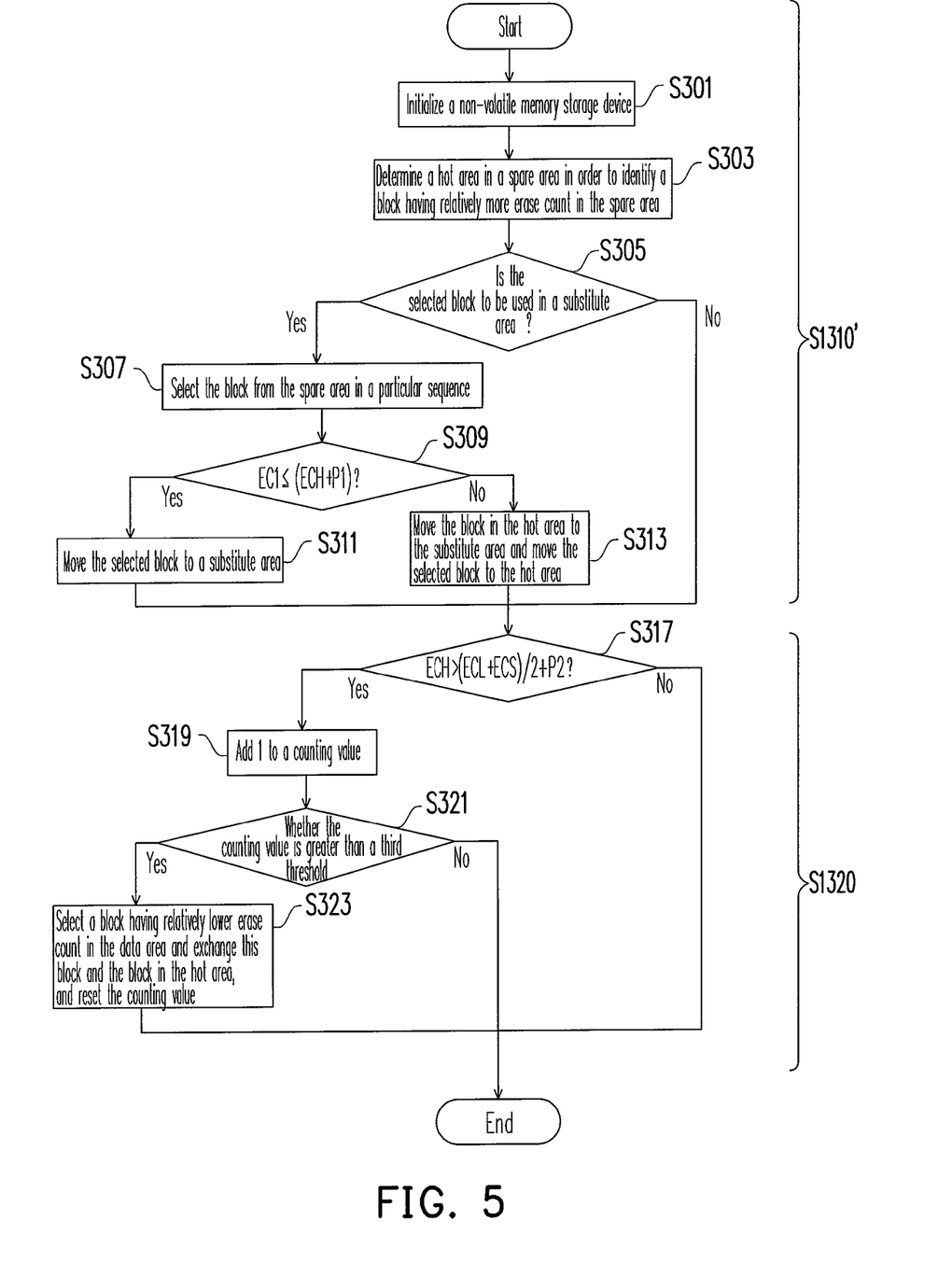
FIG. 5 is a flowchart of a wear leveling method according to a second embodiment of the present invention.

FIG. 5 is a flowchart of a wear leveling method according to the second embodiment of the present invention. Referring to FIG. 5, the difference of the flowchart illustrated in FIG. 5 from the flowchart illustrated in FIG. 3 is that in step S1310', a selection condition is specified only to blocks which are to be used in the substitute area 208. In the second embodiment, the selection condition for selecting blocks to be used in the substitute area 208 and the other steps of the wear leveling method are the same as those illustrated in FIG. 3 therefore will not be described herein.

Third Embodiment

The hardware structure, the operation of the non-volatile memory, and the recording of the block erase counts in the third embodiment of the present invention are the same as those in the first embodiment (as shown in FIGS. 1A~1B, 2A~2B, and 4A~4D) therefore will not be described herein. The difference between the third embodiment and the first embodiment is that in the third embodiment, a selection condition is specified to blocks which are to be used only in the temporary area.

Figure 6:
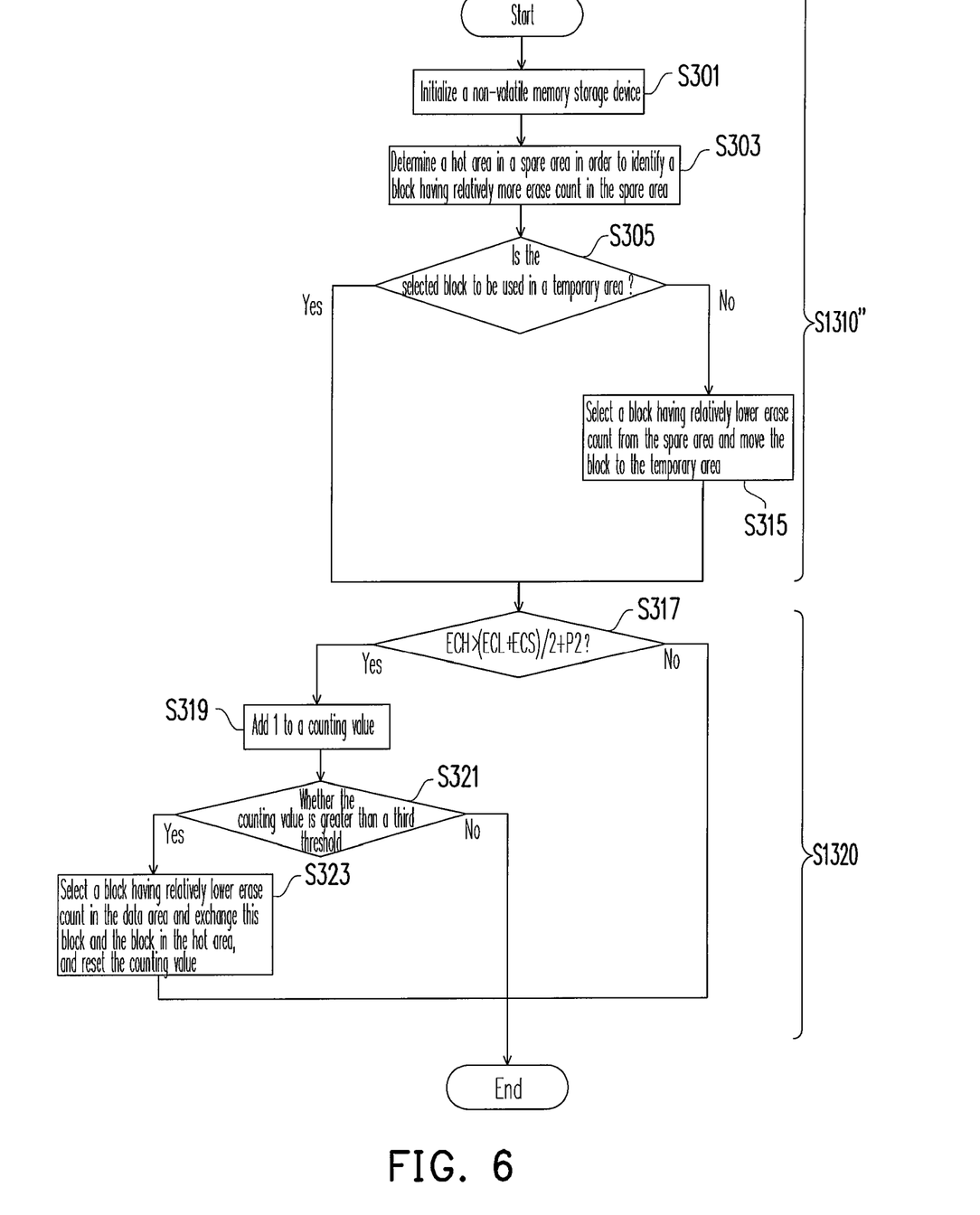
FIG. 6 is a flowchart of a wear leveling method according to a third embodiment of the present invention.

FIG. 6 is a flowchart of a wear leveling method according to the third embodiment of the present invention. Referring to FIG. 6, the difference of the flowchart illustrated in FIG. 6 from the flowchart illustrated in FIG. 3 is that in step S1310", a selection condition is specified to only blocks which are to be used in the temporary area 210. In the third embodiment, the selection condition for selecting blocks to be used in the temporary area 210 and the other steps of the wear leveling method are the same as those illustrated in FIG. 3 therefore will not be described herein.

Fourth Embodiment

The hardware structure, the operation of the non-volatile memory, and the recording of the block erase counts in the fourth embodiment of the present invention are the same as those in the first embodiment (as shown in FIGS. 1A~1B, 2A~2B, and 4A~4D) therefore will not be described herein. The difference of the fourth embodiment from the first embodiment is that the steps for starting the weal level procedure are simplified in the wear leveling method of the fourth embodiment.

Figure 7:
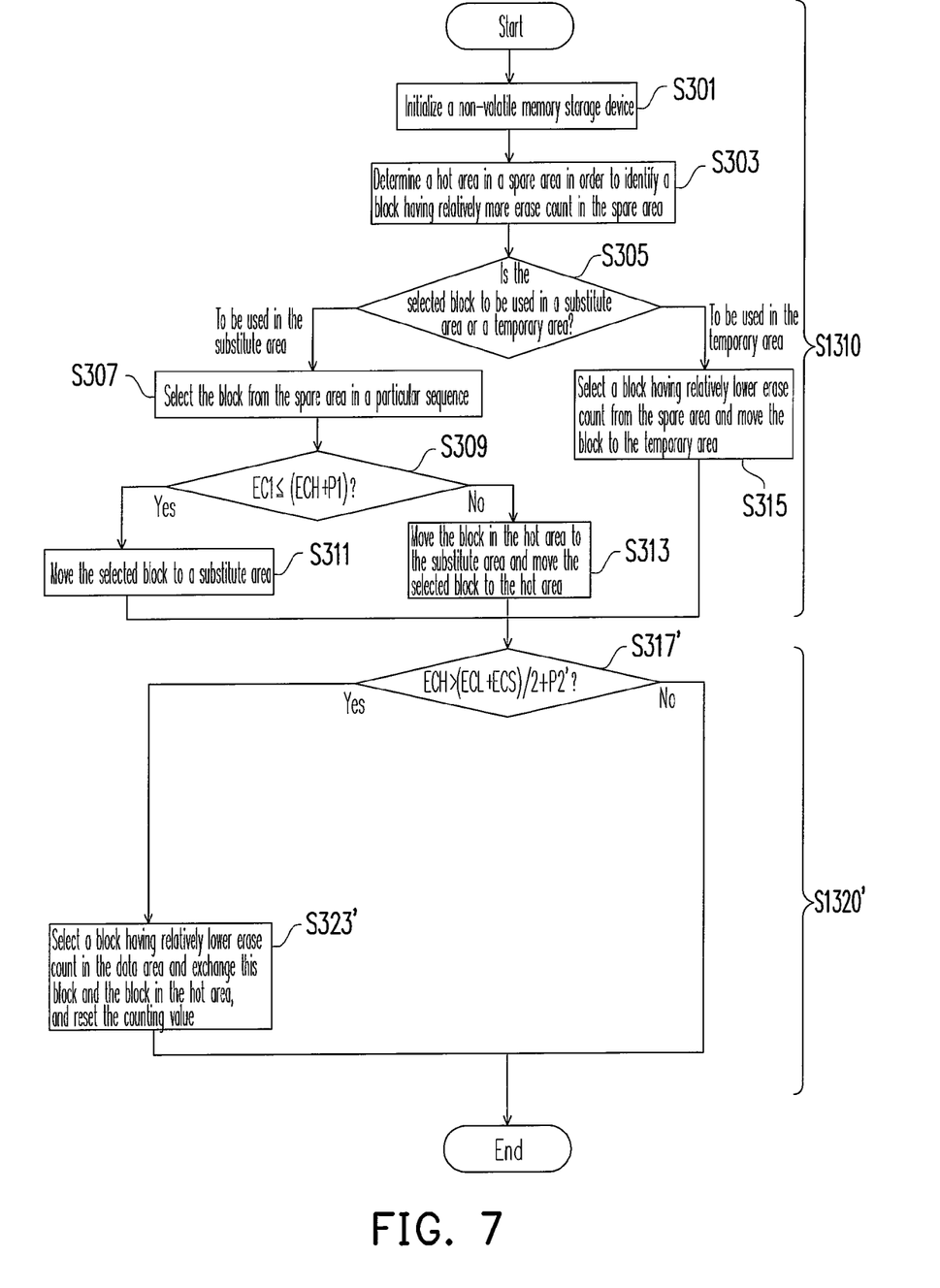
FIG. 7 is a flowchart of a wear leveling method according to a fourth embodiment of the present invention.

FIG. 7 is a flowchart of a wear leveling method according to the fourth embodiment of the present invention. Referring to FIG. 7, the difference of the flowchart illustrated in FIG. 7 from the flowchart illustrated in FIG. 3 is that in FIG. 7, the steps S317~S323 are combined and simplified into one step S1320', and the other steps are the same as those in FIG. 3 therefore will not be described herein. The step S1320' includes determining whether ECH>(ECL+ECS)/2+P2' (step S317') and starting and executing the wear leveling procedure if ECH>(ECL+ECS)/2+P2' (step S323'), wherein P2' is a fourth threshold. In the present invention, the fourth threshold is a number determined according to an expected wear levelling effect.

It should be mentioned that in all of foregoing embodiments illustrated in FIG. 3, FIG. 5, FIG. 6, and FIG. 7, the wear leveling procedure is always started and executed under certain conditions. However, in another embodiment of the present invention, the wear leveling procedure may be started and executed randomly (not shown).

Figure 8:
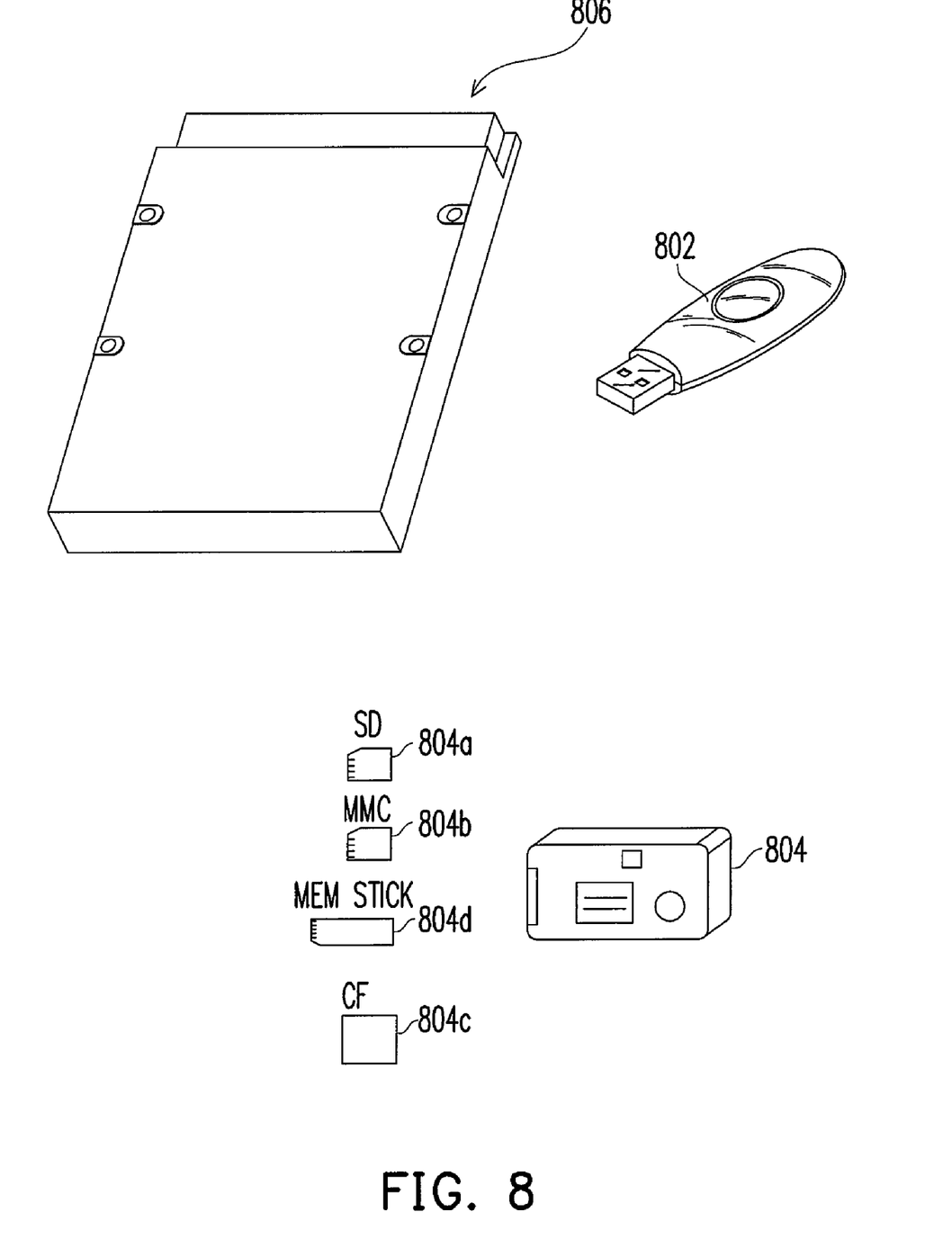
FIG. 8 illustrates various devices to which a wear leveling method according to an embodiment of the present invention can be applied.

The wear leveling method provided by the present invention is suitable for a non-volatile memory. Accordingly, the wear leveling method provided by the present invention can be applied to various devices which use non-volatile memories as their storage media, such as a USB flash drive 802, a SD card 804a, MMC card 804b, CF card 804c, and memory stick 804d used by a digital camera (video camera) 804, and a solid state drive (SSD) 806 as shown in FIG. 8. In particular, the SSD 806 requires an effective wear leveling method.

In summary, the wear leveling method provided by the present invention for a non-volatile memory can level the wear of blocks in the non-volatile memory effectively and accordingly the life of the non-volatile memory can be prolonged. Moreover, the total erase count in the wear leveling method provided by the present invention is similar to that in the conventional technique, so that compared to the conventional technique, the wear level method provided by the present invention can level the erase counts of the blocks in the non-volatile memory more effectively without increasing the erase load of the non-volatile memory.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wear leveling method for a non-volatile memory, wherein the non-volatile memory is substantially divided into a plurality of blocks, and the blocks are grouped into at least a data area, a spare area, a substitute area, and a temporary area, the wear leveling method comprising:
    (a) determining the blocks to be selected from the spare area is used for the substitute area or the temporary area;
    (b) selecting the blocks from the spare area according to a result determined by the step (a), wherein the blocks in the substitute area used for substituting blocks in the data area and the blocks in the temporary area used for storing data of small quantity; and
    (c) executing a wear leveling procedure,
    wherein step (b) comprises:
    determining a hot area in the spare area in order to identify at least one block having relatively higher erase count in the spare area; and
    when a first block is selected from the spare area to be used in the substitute area, moving the first block to the substitute area if the erase count of the first block is lower than or equal to the sum of the erase count of the block in the hot area and a first threshold, and moving one of the at least one block in the hot area to the substitute area and identifying the first block as a block in the hot area if the erase count of the first block is greater than the sum of the erase count of the block in the hot area and the first threshold.

2. The wear leveling method according to claim 1, wherein step (b) further comprises:
    selecting a second block to be used in the temporary area from the spare area, wherein the second block is a block having relatively lower erase count in the spare area.

3. The wear leveling method according to claim 1, wherein the wear leveling procedure comprises moving one of the at least one block in the hot area to the data area, and at the same time, moving a third block in the data area to the spare area and identifying the third block as a block in the hot area, wherein the third block is a block having relatively lower erase count in the data area.

4. The wear leveling method according to claim 1 further comprising:
    adding 1 to a counting value when the erase count of the block in the hot area is greater than the sum of the intermediate value of a maximum erase count and a minimum erase count among the erase counts of the blocks and a second threshold; and
    executing step (c) and resetting the counting value when the counting value is greater than a third threshold.

5. The wear leveling method according to claim 1 further comprising:
    adding 1 to a counting value when executing a write or erase command; and
    executing step (c) and resetting the counting value when the counting value is greater than a third threshold.

6. The wear leveling method according to claim 1 further comprising:
    executing step (c) when the erase count of the block in the hot area is greater than the sum of the intermediate value of a maximum erase count and a minimum erase count among the erase counts of the blocks and a fourth threshold.

7. The wear leveling method according to claim 1 further comprising:
    executing step (c) randomly.

8. The wear leveling method according to claim 1 further comprising establishing at least one data block erase count table, one spare block erase count table, one substitute block erase count table, and one temporary block erase count table corresponding to at least one zone in the data area for respectively recording the erase counts of blocks in the data area, the spare area, the substitute area, and the temporary area.

9. The wear leveling method according to claim 8, wherein the step of establishing the data block erase count table is to establish the data block erase count table corresponding to a logical-physical mapping table, wherein the data block erase count table respectively records the erase counts of blocks in the data area corresponding to the logical-physical mapping table.

10. The wear leveling method according to claim 8 further comprising storing the data block erase count table, the spare block erase count table, the substitute block erase count table, and the temporary block erase count table into a system area which further groups the blocks.

11. The wear leveling method according to claim 8 further comprising increasing the erase count of a block while erasing or writing data into the block.

12. The wear leveling method according to claim 8 further comprising scanning the data block erase count table and recording a block having the lowest erase count while erasing or writing data into a block.

13. The wear leveling method according to claim 8 further comprising updating at least one of the data block erase count table, the spare block erase count table, the substitute block erase count table, and the temporary block erase count table while updating blocks in the spare area.

14. The wear leveling method according to claim 1 further comprising executing a normal write command issued by a host to complete step (c).

15. A controller, suitable for a storage device, wherein a non-volatile memory of the storage device is substantially divided into a plurality of blocks, and the blocks are grouped into at least a data area, a spare area, a substitute area, and a temporary area, the controller comprising:
    a microprocessor unit is configured for controlling a whole operation of the controller;
    a buffer memory is electrically connected to the microprocessor unit and configured for temporarily storing data;
    a non-volatile memory interface is electrically connected to the microprocessor unit and configured for accessing the non-volatile memory; and a memory management module is electrically connected to the microprocessor unit and configured for managing the non-volatile memory, wherein the memory management module determines the blocks to be selected from the spare area is used for the substitute area or the temporary area, selects the blocks from the spare area according to a determined result and exchanges a block in the spare area with a block in the data area, wherein the blocks in the substitute area used for substituting blocks in the data area and the blocks in the temporary area used for storing data of small quantity, wherein the memory management module further determines a hot area in the spare area in order to identify at least one block having relatively higher erase count in the spare area, and when a first block is selected from the spare area to be used in the substitute area, the memory management module moves the first block to the substitute area if the erase count of the first block is lower than or equal to the sum of the erase count of the block in the hot area and a first threshold, and the memory management module moves one of the at least one block in the hot area to the substitute area and identifying the first block as a block in the hot area if the erase count of the first block is greater than the sum of the erase count of the block in the hot area and the first threshold.

16. The controller according to claim 15, wherein the memory management module selects a second block to be used in the temporary area from the spare area and the second block is a block having relatively lower erase count in the spare area.

17. The controller according to claim 15, wherein for exchanging the block in the spare area with the block in the data area, the memory management module moves one of the at least one block in the hot area to the data area, and moves a third block in the data area to the spare area and identifying the third block as a block in the hot area, wherein the third block is a block having relatively lower erase count in the data area.

18. The controller according to claim 15, wherein the memory management module further adds 1 to a counting value when the erase count of the block in the hot area is greater than the sum of the intermediate value of a maximum erase count and a minimum erase count among the erase counts of the blocks and a second threshold, and exchanges the block in the spare area with the block in the data area and resets the counting value when the counting value is greater than a third threshold.

19. The controller according to claim 15, wherein the memory management module further adds 1 to a counting value when executing a write or erase command, and exchanges the block in the spare area with the block in the data area and resets the counting value when the counting value is greater than a third threshold.

20. The controller according to claim 15, wherein the memory management module exchanges the block in the spare area with the block in the data area when the erase count of the block in the hot area is greater than the sum of the intermediate value of a maximum erase count and a minimum erase count among the erase counts of the blocks and a fourth threshold.

21. The controller according to claim 15, wherein the memory management module randomly exchanges the block in the spare area with the block in the data area.

22. The controller according to claim 15, wherein the memory management module further establishes at least one data block erase count table, one spare block erase count table, one substitute block erase count table, and one temporary block erase count table corresponding to at least one zone in the data area for respectively recording the erase counts of blocks in the data area, the spare area, the substitute area, and the temporary area.

23. The controller according to claim 22, wherein the memory management module establishes the data block erase count table corresponding to a logical-physical mapping table, wherein the data block erase count table respectively records the erase counts of blocks in the data area corresponding to the logical-physical mapping table.

24. The controller according to claim 22, wherein the memory management module further stores the data block erase count table, the spare block erase count table, the substitute block erase count table, and the temporary block erase count table into a system area which further groups the blocks.

25. The controller according to claim 22, wherein the memory management module increases the erase count of a block while erasing or writing data into the block.

26. The controller according to claim 22, wherein the memory management module further scans the data block erase count table and records a block having the lowest erase count while erasing or writing data into a block.

27. The controller according to claim 22, wherein the memory management module further updates at least one of the data block erase count table, the spare block erase count table, the substitute block erase count table, and the temporary block erase count table while updating blocks in the spare area.

28. The controller according to claim 15, wherein the memory management module further executes a normal write command issued by a host to exchange the block in the spare area with the block in the data area.

29. The controller according to claim 15, wherein the non-volatile memory is a SLC NAND flash memory or a MLC NAND flash memory.

30. A wear leveling method for a non-volatile memory, wherein the non-volatile memory is substantially divided into a plurality of blocks, and the blocks are grouped into at least a data area, a spare area, and a substitute area, the wear leveling method comprising (a) determining a hot area in the spare area in order to identify at least one block having relatively higher erase count in the spare area;

(b) selecting a first block from the spare area to be used in the substitute area by using the sum of the erase count of the block in the hot area and a first threshold as a selection condition; and (c) executing a wear leveling procedure, wherein the wear leveling procedure comprises moving one of the at least one block in the hot area to the data area, and at the same time, moving a third block in the data area to the spare area and identifying the third block as a block in the hot area, wherein the third block is a block having relatively lower erase count in the data area.

31. The wear leveling method according to claim 30, wherein the selection condition comprises:

moving the first block to the substitute area if the erase count of the first block is lower than or equal to the sum of the erase count of the block in the hot area and the first threshold, and moving one of the at least one block in the hot area to the substitute area and identifying the first block as a block in the hot area if the erase count of the first block is greater than the sum of the erase count of the block in the hot area and the first threshold.

32. The wear leveling method according to claim 30 further comprising:
adding 1 to a counting value when the erase count of the block in the hot area is greater than the sum of the intermediate value of a maximum erase count and a minimum erase count among the erase counts of the blocks and a second threshold; and
executing step (c) and resetting the counting value when the counting value is greater than a third threshold.

33. The wear leveling method according to claim 30 further comprising:
adding 1 to the counting value when executing a write or erase command; and
executing step (c) and resetting the counting value when the counting value is greater than the third threshold.

34. The wear leveling method according to claim 30 further comprising:
executing step (c) when the erase count of the block in the hot area is greater than the sum of the intermediate value of a maximum erase count and a minimum erase count among the erase counts of the blocks and a fourth threshold.

35. A controller, suitable for a storage device, wherein a non-volatile memory of the storage device is substantially divided into a plurality of blocks, and the blocks are grouped into at least a data area, a spare area, and a substitute area, the controller comprising:
a microprocessor unit is configured for controlling a whole operation of the controller;
a buffer memory is electrically connected to the microprocessor unit and configured for temporarily storing data;
a non-volatile memory interface is electrically connected to the microprocessor unit and configured for accessing the non-volatile memory; and
a memory management module is electrically connected to the microprocessor unit and configured for managing the non-volatile memory,
wherein the memory management module determines a hot area in the spare area in order to identify at least one block having relatively higher erase count in the spare area, selects a first block from the spare area to be used in the substitute area by using the sum of the erase count of the block in the hot area and a first threshold as a selection condition, and exchanges a block in the spare area with a block in the data area.

36. The controller according to claim 35, wherein the selection condition comprises:
moving the first block to the substitute area if the erase count of the first block is lower than or equal to the sum of the erase count of the block in the hot area and the first threshold, and moving one of the at least one block in the hot area to the substitute area and identifying the first block as a block in the hot area if the erase count of the first block is greater than the sum of the erase count of the block in the hot area and the first threshold.

37. The controller according to claim 35, wherein for exchanging the block in the spare area with the block in the data area, the memory management module moves one of the at least one block in the hot area to the data area, and moves a third block in the data area to the spare area and identifying the third block as a block in the hot area, wherein the third block is a block having relatively lower erase count in the data area.

38. The controller according to claim 35, wherein the memory management module further adds 1 to a counting value when the erase count of the block in the hot area is greater than the sum of the intermediate value of a maximum erase count and a minimum erase count among the erase counts of the blocks and a second threshold, and exchanges the block in the spare area with the block in the data area and resets the counting value when the counting value is greater than a third threshold.

39. The controller according to claim 35, wherein the memory management module further adds 1 to the counting value when executing a write or erase command, and exchanges the block in the spare area with the block in the data area resets the counting value when the counting value is greater than the third threshold.

40. The controller according to claim 35, wherein the memory management module exchanges the block in the spare area with the block in the data area when the erase count of the block in the hot area is greater than the sum of the intermediate value of a maximum erase count and a minimum erase count among the erase counts of the blocks and a fourth threshold.

41. A wear leveling method for a non-volatile memory, wherein the non-volatile memory is substantially divided into a plurality of blocks, and the blocks are grouped into at least a data area, a spare area, and a substitute area, the wear leveling method comprising:
(a) determining a hot area in the spare area in order to identify at least one block having relatively higher erase count in the spare area;
(b) selecting a first block from the spare area to be used in the substitute area;
(c) using the comparison between the erase count of the hot area and a predetermined value as a counting condition; and
(d) executing a wear leveling procedure when a counting value is greater than a third threshold,
wherein the counting condition comprises:
adding 1 to the counting value when the erase count of the block in the hot area is greater than the sum of the predetermined value and a second threshold.

42. The wear leveling method according to claim 41, wherein the predetermined value is the intermediate value of a maximum erase count and a minimum erase count among the erase counts of the blocks.

43. The wear leveling method according to claim 41, wherein the wear leveling procedure comprises moving one of the at least one block in the hot area to the data area, and at the same time, moving a third block in the data area to the spare area and identifying the third block as a block in the hot area, wherein the third block is a block having relatively lower erase count in the data area.

44. The wear leveling method according to claim 41 further comprising establishing at least one data block erase count table, one spare block erase count table, one substitute block erase count table, and one temporary block erase count table corresponding to at least one zone in the data area for respectively recording the erase counts of blocks in the data area, the spare area, the substitute area, and the temporary area.

45. The wear leveling method according to claim 41 further comprising executing a normal write command issued by a host to complete the wear leveling procedure.

* * * * *